US011484044B1

(12) United States Patent
Grabinski et al.

(10) Patent No.: US 11,484,044 B1
(45) Date of Patent: Nov. 1, 2022

(54) MODIFICATION AND EXTRUSION OF PROTEINS TO MANUFACTURE MOISTURE TEXTURIZED PROTEIN

(71) Applicant: Nowadays Inc., PBC, Dover, DE (US)

(72) Inventors: Dominik Grabinski, San Francisco, CA (US); William R. Aimutis, Denver, NC (US)

(73) Assignee: NOWADAYS INC., PBC, Dover, DE (US)

( * ) Notice: Subject to any disclaimer, the term of this patent is extended or adjusted under 35 U.S.C. 154(b) by 0 days.

(21) Appl. No.: 17/468,369

(22) Filed: Sep. 7, 2021

Related U.S. Application Data (60) Provisional application No. 63/194,530, filed on May 28, 2021.

(51) Int. Cl.
| | |
|---|---|
| *A23J 3/22* | (2006.01) |
| *A23J 3/14* | (2006.01) |
| *A23J 3/26* | (2006.01) |
| *A23L 11/00* | (2021.01) |
| *A23L 33/145* | (2016.01) |
| *A23L 29/00* | (2016.01) |
| *A23L 29/256* | (2016.01) |
| *A23L 29/231* | (2016.01) |
| *A23P 30/20* | (2016.01) |
| *A23L 33/22* | (2016.01) |

(52) U.S. Cl.
CPC .............. *A23J 3/227* (2013.01); *A23J 3/14* (2013.01); *A23J 3/26* (2013.01); *A23L 11/05* (2016.08); *A23L 29/015* (2016.08); *A23L 29/231* (2016.08); *A23L 29/256* (2016.08); *A23L 33/145* (2016.08); *A23L 33/22* (2016.08); *A23P 30/20* (2016.08); *A23V 2002/00* (2013.01)

(58) Field of Classification Search
CPC ...... A23J 3/227; A23J 3/14; A23J 3/26; A23L 33/145; A23L 33/22; A23L 11/05; A23L 29/231; A23L 29/256; A23L 29/015; A23P 30/20; A23V 2002/00
USPC ....... 426/656, 615, 629, 634, 512, 516, 573, 426/574, 577
See application file for complete search history.

(56) References Cited

U.S. PATENT DOCUMENTS

| | | |
|---|---|---|
| 8,293,316 B2 | 10/2012 | Castillo |
| 9,301,539 B2 | 4/2016 | Appel |
| 10,039,306 B2 | 8/2018 | Vrljic |
| 10,172,380 B2 | 1/2019 | Varadan |
| 10,798,958 B2 | 10/2020 | Varadan |
| 10,863,761 B2 | 12/2020 | Brown |
| 10,918,117 B2 | 2/2021 | Walther |
| 11,013,250 B2 | 5/2021 | Vrljic |
| 2005/0112271 A1 | 5/2005 | Pickarski |
| 2007/0269571 A1 | 11/2007 | Akita |
| 2008/0014330 A1 | 1/2008 | Chen |
| 2008/0268112 A1 | 10/2008 | Rolan |
| 2009/0208612 A1 | 8/2009 | Reiser |
| 2010/0074998 A1 | 3/2010 | Espeleta |
| 2011/0091604 A1 | 4/2011 | Miller |
| 2011/0171359 A1 | 7/2011 | Kweldam |
| 2013/0236626 A1 | 9/2013 | Brackenridge |
| 2014/0161958 A1 | 6/2014 | Brackenridge |
| 2014/0272094 A1 | 9/2014 | Joh |
| 2015/0305390 A1* | 10/2015 | Vrljic .................... A23L 13/424 426/574 |
| 2015/0351427 A1 | 12/2015 | Rose |
| 2015/0351435 A1* | 12/2015 | Fraser ................... A23L 13/424 426/533 |
| 2016/0066612 A1 | 3/2016 | Mou |
| 2017/0105438 A1 | 4/2017 | Ajami |
| 2017/0253849 A1 | 9/2017 | Miller |
| 2018/0310599 A1 | 11/2018 | Ajami |
| 2020/0054052 A1 | 2/2020 | Wang |

(Continued)

FOREIGN PATENT DOCUMENTS

| | | |
|---|---|---|
| CN | 112715745 | 4/2021 |
| EP | 1254604 | 11/2002 |

(Continued)

OTHER PUBLICATIONS

Raza et al., Formation of beef-like odorants from glutathione-enriched yeast extract via Maillard reaction, Food Funct. Oct. 21, 2020;11(10):8583-8601. doi: 10.1039/d0fo01946a., https://pubmed.ncbi.nlm.nih.gov/33026027/.*

(Continued)

*Primary Examiner* — Leslie A Wong (74) *Attorney, Agent, or Firm* — Pabst Patent Group LLP (57) ABSTRACT

Legume plant-based proteins, especially pea protein, are used as a primary source for twin-screw extrusion to manufacture an intermediate moisture, texturized protein piece that can be further processed by controlled hydration and coated with a batter, breading, or coating to produce a comestible product. Protein is the predominate ingredient (70-95%) in the extruded piece. In the preferred embodiment, the protein is pea powder and flavor is provided by addition of yeast extract to impart beef, chicken, or pork flavor. Additional components in the form of hydrophilic polymers and alkalai are also added prior to extrusion to insure desired texture and handling properties. The hydrophilic polymers impart functional properties such as water-binding, thereby aiding in foaming, emulsifying, texturizing, and gelation, important to manufacturing an intermediate moisture texturized plant-protein product by extrusion.

20 Claims, 3 Drawing Sheets

(56) References Cited

U.S. PATENT DOCUMENTS

| | | | |
|---|---|---|---|
| 2020/0060309 A1 | 2/2020 | Calleja | |
| 2020/0305476 A1 | 10/2020 | Sterner | |
| 2020/0323238 A1 | 10/2020 | Pibarot | |
| 2021/0289813 A1* | 9/2021 | Lee | A23J 3/227 |

FOREIGN PATENT DOCUMENTS

| | | |
|---|---|---|
| WO | 2019/134992 | 7/2019 |
| WO | 2019134992 | 7/2019 |
| WO | 2020/038601 | 2/2020 |
| WO | 2020038601 | 2/2020 |
| WO | 2021/078707 | 4/2021 |
| WO | 2021078707 | 4/2021 |
| WO | 2021/119498 | 6/2021 |
| WO | 2021/119614 | 6/2021 |
| WO | 2021119498 | 6/2021 |
| WO | 2021119614 | 6/2021 |
| WO | 2021/181291 | 9/2021 |
| WO | 2021/191913 | 9/2021 |
| WO | 2021181291 | 9/2021 |
| WO | 2021191913 | 9/2021 |

OTHER PUBLICATIONS

Lin, et al., "Extrusion Precess Parameters, Sensory Characteristics, and Structural Properties of a High Moisture Soy Protein Meat Analog", J. Food Sci, 67:1066-1072 (2002).

Anderson, et al., "Gelatinization of Corn Grits by Roll Cooking, Extrusion Cooking and Steaming", *Starch*, 22: 130-135 (1970).

De Mesa, et al., "Soy protein-fortified expanded extrudates: Baseline study using normal corn starch", *J.Food Engineering*, 90(2):262-270 (2009).

Hashimoto, et al., "Effects of extrusion conditions on quality of cassava bran/cassava starch extrudates", *Intl. J. Food Sci Technol.*, 38:511-517 (2003).

Lin, et al., "Extrusion Process Parameters, Sensory Characteristics, and Structural Properties of a High Moisture Soy Protein Meat Analog", *J. Food Sci*, 67:1066-1072 (2002).

Ma, et al., "Effects of green tea contents on the quality and antioxidant properties of textured vegetable protein by extrusion-cooking", *Food Sci. Biotechnol.*, 28(1):67-74 (2019).

Oikonomou, "Literature Data Compilation of WAI and WSI of Extrudate Food Products", *Internat. J. of Food Prop.*, 14(1):199-240 (2011).

Samard, et al., "A comparison of physicochemical characteristics, texture, and structure of meat analogue and meats", *J. Sci. Food Agriculture*, 99(6):2708-2715 (2019).

\* cited by examiner

FIG. 1

SLOTTED INSERT

MODIFICATION AND EXTRUSION OF PROTEINS TO MANUFACTURE MOISTURE TEXTURIZED PROTEIN

FIELD OF THE INVENTION

The present disclosure relates to methods for modifying processes for producing extruded plant-based protein products.

BACKGROUND OF THE INVENTION

Plant-based meat alternatives are becoming more sophisticated and taking on meat-specific attributes. Taste, texture, aroma and appearance should be formulated to mimic meat. Protein levels and composition should be comparable to meat. The meat alternatives should be perceived as a complete replacement of items like beef, pork, poultry and seafood.

Nutrition and health are the top drivers for consumption of plant-based meat alternatives. Formulators may fortify the alternatives with protein and fiber and find a way to maintain taste when salt, fat or sugar are replaced. Taste can be modified by including taste-modulating ingredients, such as marinades, rubs, glazes, seasonings, meat flavors, smoke and grill flavors, and yeast-based systems and non-yeast-based systems that enhance savory flavors. Preference is for natural flavors and extracts, natural preservatives, and seasonings perceived as a clean label, according to Kerry.

The protein base affects the taste, consistency and stability of plant-based meat alternatives as well as how they cook. In one survey, the most preferred sources of plant protein were beans/legumes at 62% and nuts at 55%. Other preferred sources were mushrooms at 48%, lentils at 46%, potatoes at 46%, rice at 46%, quinoa at 45%, tofu at 42%, a blend of sources at 41% and seeds at 40%. People would like to see more plant-based options, including formats for sausage, strips and nuggets as well as crumbles that may be used in tacos, burritos, breakfast items and pizza toppings.

Demand for meat alternatives has grown and will continue to rise, but the industry still has hurdles to overcome in different parts of the world. The global meat substitutes sector is currently worth about $20.7 billion, and is predicted to grow to $23.2 billion by 2024, market research company Euromonitor told CNBC. That growth is being spurred by concerns ranging from animal welfare to food security and the Covid-19 pandemic.

However, obstacles remain for the burgeoning market. Generally speaking, the production of plant-based meat substitutes involves many processing stages. In terms of the resulting product quality, mixing is among the most decisive steps in the entire manufacturing process. This is because base mixes for alternative meat products often contain over 30 different components with physical properties that vary hugely in terms of moisture, density, particle size, rheology, and stability. For some plant-based meat products, the premixes consist exclusively of dry, powdery ingredients. Other products use pasty, mushy premixes already containing a high proportion of liquid.

Plant-based meat substitutes are often manufactured, transferred, and packaged in a continuous process. This is especially true for sticky products that do not flow easily and for products that degrade with prolonged exposure to atmospheric oxygen.

Continuous production processes can become incredibly complex depending on the frequency of recipe changes and the number of individual components that need to be mixed. Unlike liquids, different powders can display tremendously different behaviors when dispensed, making it difficult to automate this processing step for continuous production. For this reason, it often makes the most sense to use batch production methods to prepare interim mixtures of bulk powders.

It is therefore an object of the present invention to provide an economical, reproducible process of making plant based products for use as meat substitutes, which have a desirable color, flavor and texture.

SUMMARY OF THE INVENTION

Legume plant-based proteins, especially pea protein, are used as a primary source for twin-screw extrusion to manufacture an intermediate moisture, texturized protein piece that can be further processed by controlled hydration and coated with a batter, breading, or coating to produce a comestible product.

Protein is the predominate ingredient (70-95%) in the extruded piece. In the preferred embodiment, the protein is pea powder and flavor is provided by addition of yeast extract to impart beef, chicken, or pork flavor. In the preferred embodiment, no coloring agents are added. Additional components in the form of hydrophilic polymers and alkalai are added prior to extrusion to insure desired texture and handling properties. The hydrophilic polymers impart functional properties such as water-binding, thereby aiding in foaming, emulsifying, texturizing, and gelation, important to manufacturing an intermediate moisture texturized plant-protein product by extrusion.

The additive ingredients are blended with the protein prior to extrusion to 1) modify protein functionality (alkalizing agents (e.g. NaOH, $Ca_2OH$, $Na_2CO_3$, $NaHCO_3$), and, optionally, disulfide bond breaking agents (e.g. ascorbic acid, urea) and compounds such as sodium metabisulfite, methionine, cysteine, thiamine, or combinations thereof, 2) increase particle density (e.g. fiber, starch, yeast extract, also used for flavoring), 3) provide lubrication to the extruder barrel (e.g. hydrophilic polymers and yeast extract) and to prevent over texturizing the extrudate and creating a extrudate that is tough in texture, and 4) control moisture (e.g., hydrophilic polymers and yeast extracts) in the extruded particle. In a preferred embodiment, the product does not include fat and/or salt.

Proteins with high water binding are important in intermediate moisture texturized plant protein extrudates to provide an extruded piece that does not excessively expand when extruded, maintains chewability, and provides fibrous texture similar to a cooked meat protein. These overcome the problems with plant-based proteins which are composed of only 60-90% protein, the balance being contaminating ingredients that interfere with creating an intermediate moisture texturized protein particle. These contaminants include starches, fibers, mineral, sugars, and lipids. Modifications such as alkalization and other chemical processing make the proteins more reactive to other ingredients (e.g. fibers, yeast extracts) being blended with the protein. Extrusion of plant protein without these modifiers yields pieces either low in moisture and very hard in texture or pieces that expand from starch gelatinization The resultant extruded intermediate moisture texturized protein is used to produce frozen or refrigerated meat alternative products. An intermediate moisture extruded piece can be used directly by consumers in cooking with no further modification. Alternatively, the intermediate moisture extrudate can combined with other ingredients to manufacture coated, battered, or breaded comestible products such as "chicken" nuggets and "fish" sticks. The product can be cut or ground, or breaded or cooked in different sauces and culinary recipes An advantage is that it maintains the desired temperature for a longer period of time, comparable to natural animal derived meat. Flavorings and texture can be used to mimic beef, chicken or fish.

DETAILED DESCRIPTION OF THE INVENTION

1. Definitions

An alkalai solution is a solution of a soluble base has a pH greater than 7.0.

Hydrophilic polymers are those polymers which dissolve in, or are swollen by, water, including many polymers of natural origin. Many foodstuffs, containing substantial amounts of carbohydrate and protein, can be classified as hydrophilic polymers. More than two-thirds of hydrophilic or water-soluble polymers used in industry are derived from polymers of natural origin.

A meat substitute or meat analogue, approximates certain aesthetic qualities (primarily texture, flavor and appearance) or chemical characteristics of a specific meat. Substitutes are often based on soybeans, gluten, peas, or legumes.

A legume is a plant in the family Fabaceae (or Leguminosae), or the fruit or seed of such a plant. When used as a dry grain, the seed is called a pulse. Legumes include alfalfa, clover, beans, peas, chickpeas, lentils, lupins, mesquite, carob, soybeans, peanuts, and tamarind. Not all legumes yield optimal meat substitutes or alternatives.

Yeast extracts are the intracellular components of the same yeast used to make bread, beer and wine, which has been separated from the cell walls. Yeast extracts have a savory taste comparable to that of a bouillon, and can taste like beef, pork, chicken or other meats.

II. Compositions

Legume Protein Source

Legumes that can be used are most typically beans, peas, chickpeas, and lentils, although others may also be used. These used to provide protein and form the majority of the product.

In a preferred embodiment, the protein source is a Pea protein isolate, either unmodified or modified. PURIS® protein (Cargill) is preferred, but other non-soy protein can be used. PURIS® pea protein is produced from U.S. yellow pea seed varieties, selected to minimize the off-flavors normally attributed to pulses. It has a minimum 80% protein content, it is not genetically modified ("Non-GMO"), certified organic, vegan, gluten-free and soy-free.

Alkalai Solutions or Powders

An important additive to produce desirable extrusion properties is an alkalai, such as sodium hydroxide, ammonium hydroxide, magnesium hydroxide, potassium hydroxide, sodium carbonate, sodium bicarbonate, potassium bicarbonate, potassium carbonate, magnesium carbonate, or mixtures thereof. The alkaline composition may be provided in solution or in dry form. It is preferably in an aqueous solution and is added to the protein and fiber compositions before injecting into the extruder. The blend of fiber and calcium hydroxide is injected with a peristatic pump to the twin screw extruder so the solution can react during the extrusion process (pH is increased to 7.5 and fiber is incorporated in the extruded mass).

The alkalai is not removed or neutralized during or after extrusion.

In one example either 10% CaOH; or 21% CaOH can be used, as demonstrated in the examples below.

Hydrophilic Polymers

Hydrophilic polymers are used to increase moisture content and improve texture. Between 3 and 10% weight/weight of the hydrophilic polymers to protein, preferably about 5% dry weight, is added. Representative hydrophilic polymers include maple fiber NOURAVANT® (RENMATRIX®) as described in the examples below, oat fiber, psyllium fiber, sodium alginate, pectin, methyl or carboxymethyl cellulose, maltodextrin. In most cases these have been processed to minimize texture and to have little to no flavor.

Chemical Additives

None.

Yeast Extract Flavoring

Yeast extracts are commercially available from a number of commercial suppliers, and have a variety of flavors depending on the source and concentration culture. Autolyzed yeast extracts have a savory and meaty flavor, which can be attributed to its content of glutamic acid, peptides, nucleotides amino acids, among other components. Glutamic acid is a naturally occurring amino acid responsible for this savory flavor. These form a flavor that can provide distinct meaty flavor notes, such as beefy, chicken, pork, seafood and smoked meaty notes. It features specific and distinct flavor and boosts the complex taste profile, lingering taste, and juiciness. Various types and amounts of yeast extract, for example from one to seven different yeast extracts, included to between one and 10% by weight can be utilized to produce the desire flavor. Typical concentration ranges in the final product are between 5-12%, w/w dry matter ("DM").

Other flavor modulator such as CLEAR TASTE® from Mycothechnology (0.05 to 0.2% inclusion), other natural flavors and flavor modulators, salt from zero up to 1%, and natural colors or whitening ingredients may also be added.

III. Methods of Making

The manufacturing of plant-based meat alternatives (PBMA) includes three stages, creating a meat-like structure (including texture), creating a meat-like appearance, and recreating a meat flavor. The selection of plant-protein sources and safety controls are vital for the production of PBMA. The structuring process is the most fundamental PBMA manufacturing step, as it is the foundation of meat-like texture formation. The significant feature of PBMA is the fibrous structure and texture. The techniques used during the structuring process is different for various meat analogues. However, these techniques can be categorized as either top-down or bottom-up. Top-down is widely accepted for commercial operations due to its robustness and ability to produce a larger volume.

Mixing is one of the most dynamic steps in the manufacturing process of PBMAs. Plant-based meat substitutes are often processed, transferred and packaged in a continuous process. This is a struggle for products that are sticky and do not flow easily. Ingredients that degrade upon exposure to atmospheric oxygen is another major hurdle. The base mix of PBMA often contains over 30 different ingredients with different physical and functional properties that vary in moisture content, particle size, rheology and stability. Continuous production processes cannot deal with frequent recipe changes and too many individual components that need to be premixed.

The percentage of soluble and insoluble components in the premix is important for structure formation. This array of makes it difficult to automate this processing step for a continuous process. Manufacturers stick with batch production methods to prepare interim mixtures to avoid complications, which are costly over time.

Real meat products require only one thermal processing. However, PBMA require much more intricate thermal treatments during the structuring process. A group of process parameters determines the final product quality. Twin-screw extruders are widely accepted for their versatility and used to achieve higher energy consistency and uniform heat distribution. For example, the final product's texture is heavily dependent on the temperature of the extrusion process, as it involves various cross-linked reactions and specific melting temperatures. Shear-induced structuring methodology achieves a small size shear cell. An optimum processing temperature of 95° C. and rotating the raw materials at slow speeds such as 20 RPM may improve the fiber structure.

Color is the main contributor to perception in taste and overall product acceptance as it is the first element to be noticed in food. Meat alternatives strive to obtain a similar appearance to red color when uncooked and brown upon cooking. However, most alternatives containing gluten or soy are yellow or beige. In the production of PBMA, the red color of raw meat is obtained by adding beet juice or soy leghemoglobin. Heat stable ingredients, such as caramel, malt extracts, reducing sugars (upon Maillard reaction), are usually added to replicate the final product with a brown appearance. These color ingredients also help in thermal stability and pH sensitivity. Maltodextrin and hydrated alginates are also used as coloring agents that help retain the color by reducing the color migration in the final product.

The process of flavor formation is complex than color formation. The flavoring agents can be categorized as either volatile or non-volatile based on the aroma and taste. Due to the complexity of meat aroma, it is a significant challenge to replicate the aroma of meat in PBMA. Although Maillard reaction and lipid degradation can be carried out in the cooking of PBMA, the slightest differences in PBMA and real meat displays a great variance in the resulting aromatic compounds. In addition to aromatic ingredients such as spices and salt, manufacturers also add the vitamin thiamine, amino acids and reducing sugars to create the impression of aromatic meat in PBMA. Chicken-like and beef-like flavors can be produced from hydrolyzed soybean protein.

The structural and functional organization of PBMA is dependent on protein properties such as its ability to retain its moisture, gelation and solubilizing capabilities. Currently, a wide array of plant-based proteins are used, ranging from non-meat proteins to insect proteins. However, soy and peas are fundamental sources due to their low costs, with a preference for proteins obtained from legumes such as chickpeas and soybeans. Not all commercial proteins are alike in their molecular behavior, and can produce widely varied products in production including extrusion. Therefore, it is necessary to carefully choose or modify protein products that build a fibril structure during extrusion that is well accepted by consumers.

Blending of Ingredients

Ingredients are mixed, then fed into the extruder.

Extrusion

A standard extruder is used. A twin screw extruder is preferred. The extrusion is performed at between 130 and 165° C., preferably between 155-162° C.

Typical time of extrusion is 5-7 minutes, using an extruder with 62 mm diameter; 1240 mm long screws.

Product is preferably extruded with a slotted die to produce pieces between one and 10 square inches (2.54 cm to 25.4 cm) length, height and/or width, although products can be produced in a range of sizes and shapes, varying from a 0.5 inch (1.27 cm) cube to much larger sizes of 8 inches (20.32 cm) by 7 inches (17.78 cm) by 1 inch (2.54 inches) pieces.

Either a dry extrusion or wet extrusion process can be used. The final product is dry, since the water and protein are mixed together in extruder, so that any moisture not bound by the protein flashes off as steam when it leaves the extruder.

Post Extrusion Processing

The final product may be post processed, for example, breaded or coated, minced, mixed with sauce, packaged dry or frozen. The product can be utilized from pizza and salads meat crunch substitutes, nuggets, strips, schnitzel, fish sticks, seafood bites and rings all six breaded or not, meat in sauces (stew size to large steaks) grounded or minces patties.

The final product may be marketed as a beef, pork, chicken or seafood or fish product.

The product can be sold dry for further rehydration before usage, frozen wet, or used directly from wet extrusion production line.

The following non-limiting examples further demonstrate the methods of making and resulting products.

The present invention will be further understood by reference to the following non-limiting examples.

Example 1: Addition of Texture Modifiers for Extrusion of Pea Protein Alone or with Yeast Extract Materials and Methods Studies were conducted to optimize production of a product with the desired texture and ease of extrusion. Testing was done using addition of dietary fiber ingredients and a pH modifier, Calcium Hydroxide [$Ca(OH)_2$].

The following materials and methods were used for testing:

Screw Extruder

Figure 1:
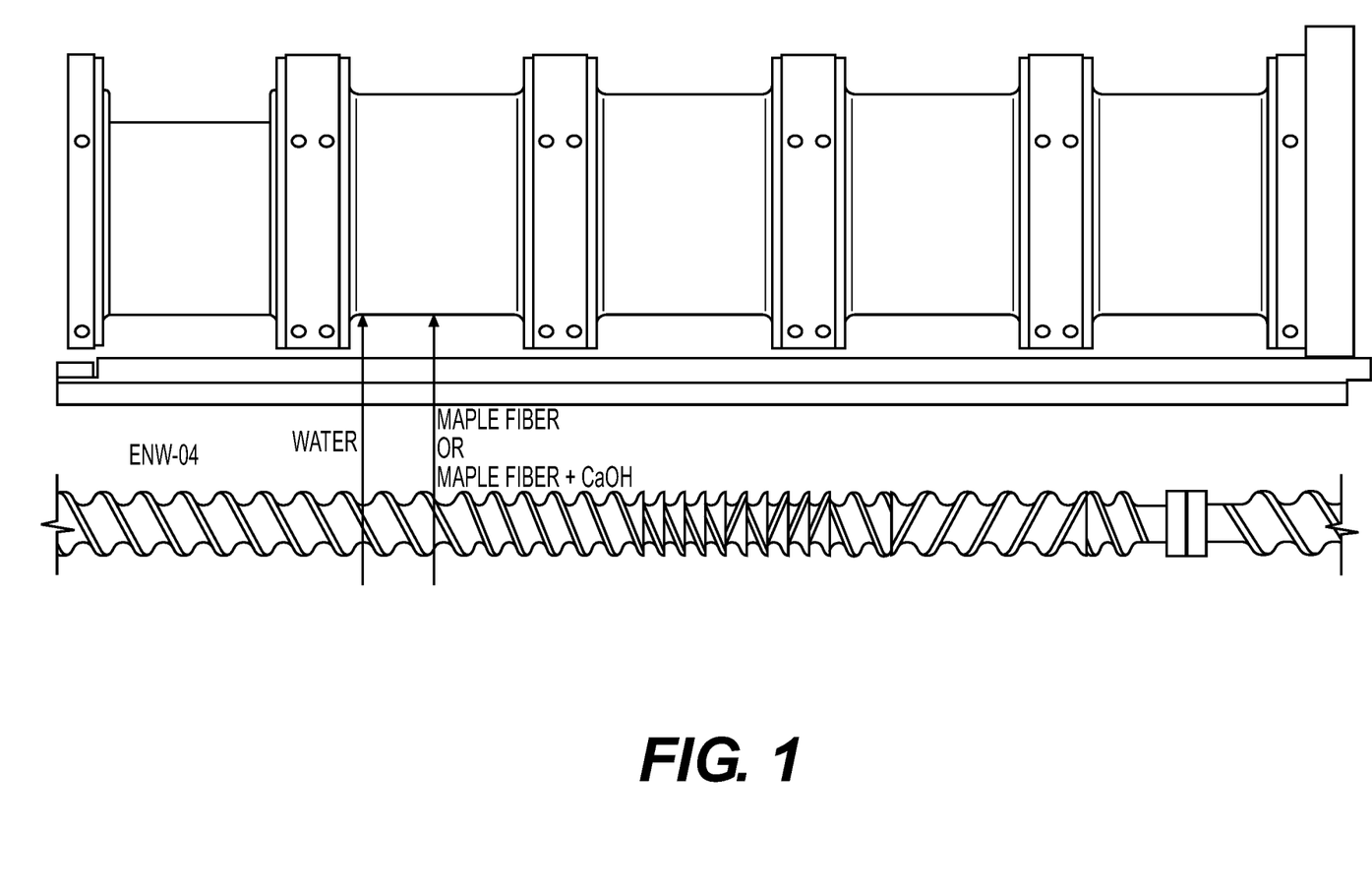
FIG. 1 is a prospective view of the screw extruder used in the examples.
Figure 2A:
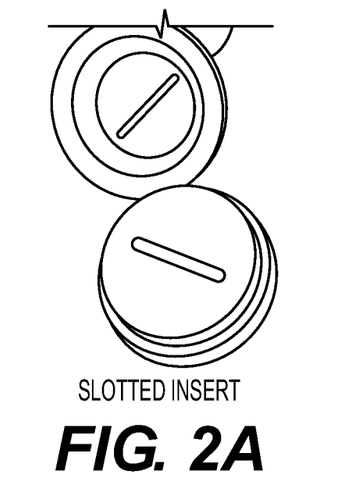
FIG. 2A is a view of the slotted die.
Figure 2B:
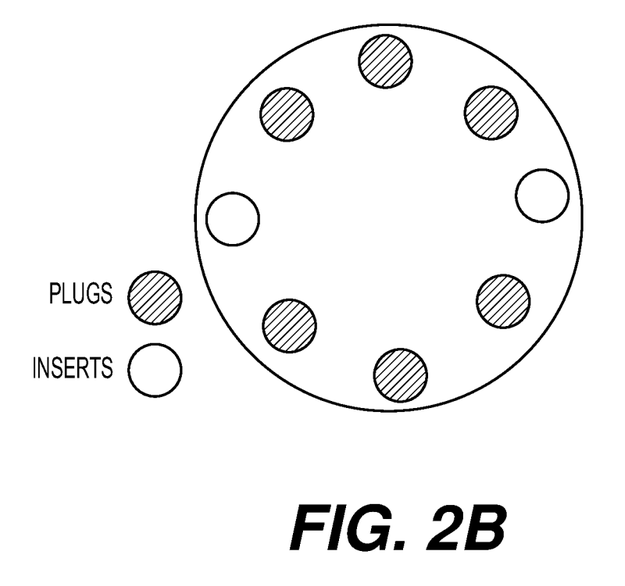
FIG. 2B is an end view of the extruder end plate.

The screw extruder used in the examples is shown in FIG. 1. The die is shown in FIG. 2A and the end plate is shown in FIG. 2B.

MSDF Sanitary Mixer:

BCTG Polytwin™ twin-screw extruder, 62 mm diameter, 20:1 L/d (5 barrels), rotary cutter with flex blades. 224 kW (300 hp) drive a maximum screw speed of 1000 RpM.

High Sanitary Single-pass Dryer, 2 heating zones and 1 cooling zone

Brabender Volumetric Feeder

PrioTherm® Conditioner

Liquid Addition cart with Netzsch progressive cavity pump and Endress-Houser flow meter

TABLE 1

Die Configurations

| | | |
|---|---|---|
| Transition Plate | BCTG-80229-810 02 | Revolver Plate w/1 ring |
| Cone + Spacers | BCTG-11213-010 | Flat cone w/2 spacers |
| Insert Plate | BCTG-11811-010 | |
| Inserts | 2- 14 mmn × 1.6 mm slot × 3 mm Land | 23 mm dia. Brass button inserts |
| Plugs | 6- 23 mm plugs | |

TABLE 2

Dry Blend Formulations
Dry Blned Formulations [PM202104dd-LL]*

| Ingredients | 07-01 | 07-02 | 07-03 | 08-02 | 08-03 | 08-04 | 08-05 |
|---|---|---|---|---|---|---|---|
| Puris 870 PPI | 100% | 70% | 90% | 99.5% | 99.0% | | |
| Puris 860 PPI | | 30% | | | | | |
| Puris 860HG | | | | | | | 99.5% |
| Oat Fiber | | | 10% | | | | |
| Sodium Alginate | | | | 0.25% | | 0.25% | |
| LM Pectin | | | | 0.25% | | 0.25% | |
| Psylium | | | | | 1.0% | | |
| Ripple Ripptien PPP | | | | | | 100% | |

*dd = day; LL = lot number

The following additive formulations in Table 3 were prepared and tested:

TABLE 3

Alkalai and Hydrophilic Polymer Formulations
Liquid Blend Formulations: [PM202104dd-LL]*

| Ingredients | 07-11 | 07-12 | 08-11 pH10-11 |
|---|---|---|---|
| Calcium Hydroxide | 10% | | |
| Maple Fiber | | 100% | 80% (4 parts)** |
| Water | 90% | | |
| 07-11 blend | | | 20% (1 parts)** |

Production Blend Formulations: (dry + liquids)

| | Date | | | | | | | | | |
|---|---|---|---|---|---|---|---|---|---|---|
| | 7 Apr. | | | 8 Apr. Samples | | | | | | |
| Blend | 01 | 02 | 03 | 01 | 02 | 03 | 04 | 05 | 06 | 07 |
| 07-01 | 77.8% | | | | | | | | | |
| 07-02 | | 73.7% | | | | | | | | |
| 07-03 | | | 84.5% | 78.8% | 75.9% | 75.4% | | | | |
| 08-01 | | | | | | | 75.7% | | | |
| 08-02 | | | | | | | | 75.4% | | |
| 08-03 | | | | | | | | | 75.4% | |
| 08-05 | | | | | | | | | | 75.4% |
| 07-11 | 1.5% | 1.7% | 0.6% | | | | | | | |
| 07-12 | | | | 21.2% | 21.1% | 21.3% | | | | |
| 08-11 | | | | | | | 21.1% | 21.3% | 21.3% | 21.3% |
| Water | 20.7% | 24.6% | 14.9% | 0.0% | 3.0% | 3.3% | 3.2% | 3.3% | 3.3% | 3.3% |

**these are approximate values, pH was measured to assure correct addition of Ca(OH)$_2$.

PURIS® 870, 870HG, and 860 Pea Protein Isolates, Roquette Oat Fiber, RENMATIX® Maple Fiber solution, Sodium Alginate, Low Methoxylated Pectin, *Psyllium* Fiber, Calcium Hydroxide, and Ripple Foods pea protein product (RIPPTEIN®).

All ingredients are food grade for human consumption and approved by BMIN FAC and NU Technology and by the customer Four types of Pea Protein ingredients were used, PURIS® 870, 860, 870HG (High Gelling), and Ripple Foods' RIPPTEIN® pea protein product.

A PRIOTHERM® Conditioner and additional liquid injection pumps were used.

The pH modified product was tested for its final pH value. The raw ingredient mixture had a pH of 6.0 to 6.5. The pH modifier was added at 3% of a 10% Ca(OH)$_2$ solution or as a mixed solution with liquid 15% maple fiber solution.

Results

Trial 1: PURIS® pea protein 870 is very difficult to extrude. One needs a lot of preconditioning, for example, using a lot of steam and a screw configuration giving a high energy. Even so extrusion is irregular and difficult to stabilize. The extrudate is very puffy Trial 2: Roquette pea protein P85G demands less screw pressure and pre-conditioning but gives a puffy product with a higher "'brownish" color and extrudate is uneven and very low in density.

Trial 3: Ripptein using the same screw configuration gives an extrudate that resembles popcorn. The product come out totally restructured and not suitable for extrusion of large pieces.

Trial 4: PURIS® 870 plus 15% of yeast extract blend products using the same parameters as trial 1 (PURIS® 870 alone) gives a more even extrusion and develops a desired flavor compared to pea protein blended while hydrated. The extrudate is more even and it is possible to extrude large pieces. However, the texture is still very puffy and not similar to a piece of meat.

Example 2: Extrusion of Pea Protein with Soluble Fiber and Alkalai

The use of soluble fibers with calcium hydroxide to yield a more cohesive extrudate (ropes) to a pea protein that may be difficult to extrude was tested.

Materials and Methods

PURIS® 870 was used as the base to which hydrophilic fiber and alkalai was added.

Fibers tested included oat fiber, 15% maple fiber liquid, 0.25% sodium alginate plus 0.25% low methoxy pectin, and *psyllium* fiber.

Calcium Hydroxide (alkalai) was used as a 10% solution, except when mixed with the liquid Maple Fiber (RENMATIX NURAVENT®). The mixture was one 20 kg bag of 15% fiber Maple Fiber solution into which 2 kg of 10% Calcium Hydroxide solution is added.

Results

The pH of the fiber-calcium hydroxide-PURIS® 870 mix was between 10 and 11 pH units.

The extrudate pH value measured after the addition of the modifier was 7.0 to 7.5. This is advantageous due to: 1) low probability of production of lysinoalanine anti-nutrient, 2) minimal flavor effects due to high pH, and 3) low amount needed to achieve a structural effect in the extrudate.

The use of soluble fibers with the addition of calcium hydroxide improved the cohesiveness of the extrudate's structure.

Pea protein alone yields a textured product but this exits the die as a fine to a crumbly spray. The addition of hydrophilic plant fiber and the alkaline pH modifier prevented formation of a spray. The extrudate's ropes were still rough, but upon rehydration were smoother and more uniform in appearance.

The treated extrudate had a measured pH value of between 7.0 and 7.5. The extruded product was not smooth in appearance exiting the die. With the pH treatment, it did become more cohesive with some ragged appearance.

TABLE 4

Extrusion conditions

| Measurement | Time | Value |
|---|---|---|
| pH of 870 PPI | 4/7 - 1400 pm | 6.2 |
| pH of Extrudate | 4/8 - 1236 pm | 7.2 |
| pH of Maple Fiber + Ca(OH)$_2$ solution | 4/8 - 1400 pm | 10.7 |

Low screw RPM gave the best extrudate appearance, with an endplate temperature in excess of 160° C.

Example 3: Optimization of Pea Protein in Combination with Alkalai and Soluble Other Hydrophilic Polymers to Allow Production of Large Pieces Further testing confirmed that PURIS® 870 alone does not allow production of large meat pieces. It was difficult to extrude even large pieces, the extrusion process was not very stable, and the resulting extrudate was puffy.

PURIS® 770 (70%) plus PURIS® 860 (30%) also did not give good results. Extrusion was even more difficult compared to PURIS® 870 alone.

PURIS® 870 plus Calcium Hydroxide (0.1% approx.) significantly improved the smoothness of the extrusion. There is a visual improvement as well as lower extrusion noise, and product flow becomes regular and is expelled by the die very regularly without breaks and mechanical noises.

PURIS® 870 plus 10% of oat fiber (VITACEL® HF 401-30) gives a similar result to PURIS® 870 plus 1% calcium Hydroxide.

PURIS® 870 plus 21% of a blend of RENMATIX NURAVENT® with a 10% solution of calcium hydroxide (4 parts NURAVENT® and 1 part CaOH) gives a much smoother extrusion, stabilizing the system and allowing much larger pieces to be run with an even aspect.

PURIS® 870 (higher gelifying capabilities) with RENMATIX NURAVENT® with a 10% solution of calcium hydroxide (4 parts NURAVENT® and 1 part CaOH) gives an additional improvement of extrusion regularity and product regularity.

However none of these products yielded the desired density.

PURIS® 870 plus RENMATIX NURAVENT® with a 21% solution of calcium hydroxide plus 0.5% of high viscosity: sodium alginate or Calcium Alginate (SATIALGINE® S 900NS Sodium Aliginate) plus 0.5% of LM pectin (Low Methoxyl Pectin extracted from the peels of citrus fruit and consisting of a complex set of polysaccharides that are present in most primary cell walls of plant) gives a perfect extrudate, smooth and very stable, appearing like a piece of meat, remaining hydrated, and mimicking a nice cut of fibrous chicken.

Other soluble/functional fibers (oat, soya, etc.) could be used in place of and/or with the RENMATIX NURAVENT® and/or SATIALGINE®.

Food grade bases other than calcium hydroxide can also be used to increase the pH of the mixture to be extruded.

Example 4: Preparation of Pea Protein Extrudates with Optimal Texture

Composition of Samples

Nine samples of texturized plant-based protein extrudates of varying compositions were maintained at room temperature. The samples are listed in Table 5.

TABLE 5

Sample number and ingredient composition of the protein extrudates

| Sample Number | Sample Composition |
|---|---|
| 1 | PURIS pea protein isolate 870 + maple fiber + CaOH |
| 2 | PURIS pea protein isolate 870 |
| 3 | PURIS pea protein isolate 870 + maple fiber + psyllium + CaOH |
| 4 | PURIS pea protein isolate 870 (HG) + maple fiber + pectin + alginate + CaOH |
| 5 | PURIS pea protein isolate 870 (HG) + maple fiber + CaOH |
| 6 | PURIS pea protein isolate 870 + yeast extract (March runs) |
| 7 | Ripptean + maple fiber + CaOH |
| 8 | NOWADAYS ® soy nuggets |
| 9 | PURIS pea protein 870 (produced on longer barrel) |

Physical Analysis of Texturized Nuggets

Bulk Density

The bulk density of the extrudates was measured "as received" using a one-liter container. The container was filled to the top without packing, leveled, and weighed to obtain the weight per volume. Two measurements were taken for each product and the bulk density results were the average of two readings.

Analysis of Texture Profile

Textural properties of hydrated extrudates were characterized with a TA-XT2 Texture Analyzer (Texture Technologies Corp., Scarsdale, N.Y., USA) according to Lin, et al., *J. Food Sci.* 2002, 67, 1066-1072. Prior to analysis, the protein extrudates were hydrated in excess filtered tap water at room temperature until full hydration occurred (about 15 to 20 min).

Shear force was determined using a Warner Bratzler knife with a guillotine block. Hydrated samples were transversely placed on the block and sheared. Five different samples were sheared.

The texture profile analysis (TPA) was conducted using a 35 mm diameter plastic cylinder to compress the sample at twice to 50% strain, with a contact force of 5 g and force threshold of 20 g for each compression. Four replicates were measured per treatment group. Data were collected for the attributes of hardness, springiness, and chewiness. Hardness is measured as the peak force during the first compression in g. Springiness is the ratio of the height of the protein product at the beginning of the second compression over the product's original height and is expressed as a percent. Cohesiveness is the ratio of the area under the second compression curve to the area under the first compression curve. Although cohesiveness was not directly used to assess texturization for this study, it was used to calculate the value of chewiness. Chewiness is a unitless number measured as hardness X cohesiveness X springiness.

Chemical Analysis of Texturized Nuggets

Sample Preparation

Texturized protein nuggets were ground to 80-120 microns using a Waring Model WSG30 Professional spice grinder. Samples were stored in plastic/foil laminated bags at room temperature until analysis.

Proximate Analysis

The amount of protein, fat, carbohydrate, moisture, and ash of all eight samples were measured using CEM Corporation instruments. Protein, moisture, and fat content were measured using the CEM Sprint, Smart 6, and Oracle instruments, respectively. Ash content was measured using an Andwin Scientific Yamato DR200 convection oven set at 700° C. Pre-weighed samples were dried overnight and weighed at completion to determine ash content.

Color

Protein isolate powder colors were measured using an Agera colorimeter (Hunter Labs). The following attributes were measured and reported:

$L^*$ is a measure of lightness. A value of 0 indicates a black color, 100 signifies a white color, and a value of 50 denotes a middle gray color.

$a^*$ represents the red-green axis. with positive and negative values indicating red and green respectively. A value of 0 signified neutral.

$b^*$ denotes the blue-yellow axis; with positive values representing yellow, negative values blue, and 0 signifying neutral.

To determine the Total Color Difference, the colorimeter was calibrated with a white standard. The Total difference in color ($\Delta E^*$) was calculated using the following equation:

$$\Delta E^* = \text{Sq.Rt.}[(\Delta L^*)^2 + (\Delta a^*)^2 + (\Delta b^*)^2] \quad (1)$$

where $\Delta L^*$, $\Delta a^*$, and $\Delta b^*$ denote the differences between the corresponding color parameter of the sample and that of the white standard ($L^*=95.55$, $a^*=-90.51$, $b^*=102.64$). The Whiteness Index (WI) was determined using the equation:

$$WI = \text{Sq.Rt.}[(100-L^*)^2 + a^{*2} + b^{*2}] \quad (2)$$

Water Activity

The water activity of powders were measured in duplicate at 23° C. using an AquaLab 4TE (Meter Food,) equipped with a thermoelectric system that allows the instrument to maintain a set chamber temperature throughout the measurement.

Water Absorption Index and Water Solubility Index

The water absorption index (WAI) was measured according to Anderson, et al. Starch 1970, 22: 130-135. The dried extruded products were ground and sifted to obtain a uniform particle size between 150 and 250 μm. The sample was weighed to 2.5 g and suspended in 30 mL of filtered tap water at room temperature. The sample was vortexed, and then agitated on a shaker table for 30 min. Next, the sample was centrifuged using a Centrifuge 5810 R 15 Amp Version (Eppendorf) for 15 min at 3,000 g. The supernatant was decanted into an evaporating dish and dried for 3 hours at 100° C. to obtain the water solubility index (WSI) as a percentage using the following equation:

$$\text{WSI } (\%) = (Ws/Wd) \times 100 \quad (3)$$

where "Ws" is the weight of dry solids from the supernatant and "Wd" is the weight of the dry sample. The gel remaining in the centrifuge tube was weighed and water absorption index was calculated as a ratio using the following equation:

$$\text{WAI} = Wg/Wd \quad (4)$$

where "Wg" is the weight of the gel and "Wd is the weight of the dry sample. Samples were tested in triplicate.

Water Holding Capacity

Water holding capacity (WHC) is defined as the amount of water that the final product can internally hold and was measured according to Applewhite, editor *Proceedings of the World Congress on Vegetable Protein Utilization in Human Foods and Animal Feedstuffs,* 1989). A 15 g sample was soaked in excess room temperature filtered tap water for 20 min. The sample was then drained on a mesh screen for 5 min and weighed to determine the final weight of the sample. WHC was completed in triplicate and calculated using the following equation:

$$\text{WHC } (\%) = [(\text{Final weight} - \text{Initial weight})/\text{Initial weight}] \times 100 \quad (5)$$

Statistical Analysis

All experiments were performed at least in duplicate unless otherwise noted above. Statistically significant differences were calculated using the Student's t-test. The level of significance used was $P<0.05$.

Effects of Ingredients on Physical and Functional Properties

Pea proteins have been reported as being difficult to extrude as a solo ingredient. It was determined that pea protein isolate could be extruded as a solo ingredient, but success was only achieved with a certain manufacturer and pea protein isolate composition. PURIS, INC. proteins were far superior to ROQUETTE (results not reported) and Ripple Foods under the extrusion conditions used to produce the nuggets in this study.

Table 6 shows the effects of the sample ingredients on the physical and functional properties of the extruded texturized plant protein nuggets. Preferred nuggets were produced from sample ingredients that scored in the median range of the measurements as determined by informal sensory analyses. Samples containing PURIS pea protein isolate 870 (HG), demonstrated the desired textural properties. For example, Sample 4 contained a mixture of PURIS pea protein isolate 870 (HG), processed maple fiber (MF), pectin (PC), alginate (AL) and calcium hydroxide (CaOH) and Sample 5 contained a mixture of PURIS, processed maple fiber and calcium hydroxide. Color and compositional analysis showed all nine variables to not be much different.

Textural properties are the quality characteristics a consumer will most readily perceive when consuming products like these plant-based "chicken" nuggets. A consumer does not want products that are too hard (variables 1, 7, 8, and 9) or too chewy (1, 2, 8, and 9) when they are masticating the product. Chewiness is perceived as rubber bands in the mouth, while hardness would be described as an unusual chicken texture. Likewise, consumers do not want them too cohesive such as noticed in variables 1, 2, 8, and 9. This would be perceived as gummy on the palette.

Color was influenced by moisture content, especially in the dried nuggets. As moisture increased so did the red color (a* values), while the yellow colors (b* values) were not affected by moisture level in the study. Moisture in the texturized nuggets is controlled in the extruder by screw speed. In these studies, the extruder screw speeds were very similar in all nine variables as was heating in the various zones of the extruder barrel.

TABLE 6

Physical and Functional Properties of Extruded Nuggets

| Properties | Variable | | | | | | | | |
|---|---|---|---|---|---|---|---|---|---|
| | 1 | 2 | 3 | 4 | 5 | 6 | 7 | 8 | 9 |
| | Composition* | | | | | | | | |
| | P, MF, Ca | P (March) | P, MF, Ps, Ca | PN, MF, Pc, Al, Ca | PN, MF, Ca | P, YE (March) | R, MF, Ca | Old Nugget | P (July) |
| *Physical properties* | | | | | | | | | |
| Bulk density (g/cm$^3$) | 0.043 | 0.053 | 0.054 | 0.061 | 0.062 | 0.068 | 0.072 | 0.252 | 0.054 |
| Moisture | 5.64 | 6.78 | 6.89 | 7.87 | 7.92 | 8.80 | 9.39 | 7.35 | 10.05 |
| Water activity | 0.358 | 0.399 | 0.384 | 0.419 | 0.404 | 0.405 | 0.492 | 0.418 | 0.599 |
| Fat | 5.75 | 5.90 | 5.99 | 6.08 | 5.97 | 5.6 | 5.53 | 0.52 | 6.03 |
| Protein | | | | | | | | | |
| Carbohydrate | | | | | | | | | |
| Ash | | | | | | | | | |
| *Color (dry powder)* | | | | | | | | | |
| L* | 68.24 | 70.49 | 67.32 | 67.73 | 69.28 | 70.54 | 65.34 | 68.18 | 66.80 |
| A | 3.40 | 3.95 | 3.85 | 3.77 | 3.43 | 3.14 | 4.37 | 4.32 | 3.81 |
| B | 19.43 | 22.01 | 20.11 | 20.39 | 19.96 | 21.90 | 19.83 | 18.63 | 17.58 |
| Delta E | 123.52 | 120.92 | 122.96 | 122.74 | 122.92 | 121.56 | 123.25 | 123.45 | 91.59 |
| Whiteness Factor | 62.61 | 62.97 | 61.44 | 61.65 | 63.20 | 63.16 | 59.83 | 62.88 | 62.24 |
| *Color (rehydrated nuggets)* | | | | | | | | | |
| L* | 55.97 | 55.52 | 53.41 | 51.67 | 52.82 | 59.06 | 48.09 | 58.34 | 51.01 |
| A | 3.30 | 3.20 | 2.86 | 3.23 | 3.58 | 2.52 | 3.57 | 2.97 | 3.69 |
| B | 16.39 | 17.18 | 15.82 | 16.67 | 16.11 | 17.48 | 14.67 | 13.23 | 16.23 |
| Delta E | 128.88 | 128.56 | 130.37 | 130.13 | 129.96 | 127.77 | 132.48 | 130.54 | 102.31 |
| Whiteness Factor | 52.90 | 52.21 | 50.71 | 48.77 | 49.83 | 55.41 | 45.94 | 56.19 | 48.26 |
| *Texture Analysis* | | | | | | | | | |
| Shear Force (g) | 1873.5$^F$ | 2097.13$^E$ | 2638.01$^D$ | 4323.69$^B$ | 3670.44$^C$ | 2742.36$^D$ | >5200$^A$ | >5200$^A$ | 3262.42$^C$ |
| Hardness (g) | 116.61$^A$ | 69.81$^B$ | 37.47$^E$ | 30.43$^E$ | 44.86$^D$ | 40.26$^D$ | 57.76$^C$ | 62.44$^C$ | 109.06$^A$ |
| Springiness | 1.33$^C$ | 1.93$^A$ | 1.33$^C$ | 1.73$^B$ | 1.29$^C$ | 1.71$^B$ | 0.86$^D$ | 135$^B$ | .96$^D$ |
| Cohesiveness (%) | 1.4$^A$ | 0.95$^E$ | 1.34$^A$ | 1.03$^D$ | 1.20$^{BC}$ | 1.26$^B$ | 1.18$^C$ | 1.13$^C$ | 1.04$^D$ |
| Chewiness | 216.48$^A$ | 127.85$^B$ | 66.73$^E$ | 54.09$^F$ | 69.24$^E$ | 86.77$^D$ | 58.35$^F$ | 123.26$^B$ | 109.42$^C$ |

*Compositional key: P, Puris 870; MF, Maple Fiber; Ca, CaOH; Ps, psyllium; PN, Puris New; Pc, Pectin; Al, Alginate; YE, Yeast Extract; R, Ripptein Rows with different capital letters are significantly different $p \leq 0.05$.

Water Absorption Index and Water Solubility Index

Figure 3A:
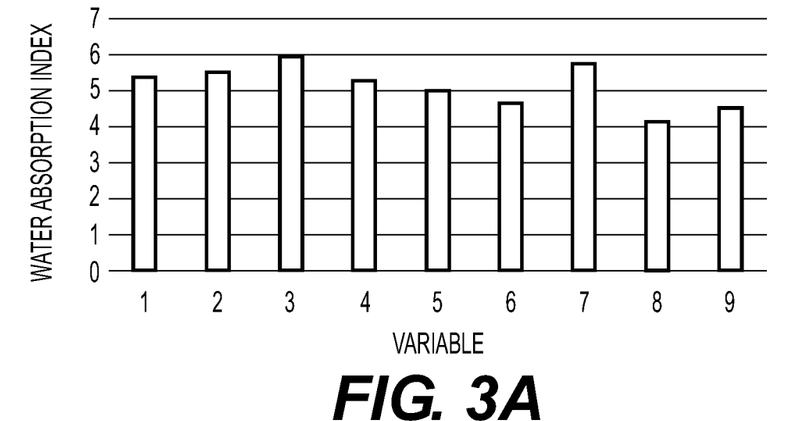
FIGS. 3A-3C are graphs of the water absorption index (3A); the % water solubility index (3B); and the % water holding capacity of the various samples (3C).

Water Absorption Index (WAI) measures the ability of a sample to bind water at the macromolecular level (FIG. 3A). Because the extrudates were ground, water absorption relates to the degree of processing and the means by which it affects the ability of macromolecular structure to bind or trap water. As such, WAI is traditionally used to determine the cook of starch. WAI increases with higher amounts of starch (Lin, et al. (2002) J. Food Sci. 67:1066-1072) and with greater degree of starch degradation from gelatinization (Oikonomou & Krokida, 2011 Inernat. J. of Food Prop. 199-240). In this study, Variables 3 and 7 had higher WAI (Table 6). Variable 3 contained psyllium fiber which is known to be an excellent water absorber. Variable 7 (RIPPTEIN) most likely contained pea starch as a contaminant in the protein isolate. The starch granules gelatinized during extrusion and could absorb water.

Water Solubility Index (WSI) shows the starch solubility in water, indicating the amount of damaged starch present (De Mesa, et al. (2009). *J. Food Engineering* 90:262-270). Higher WSI levels indicates higher levels of starch were degraded in the extruder barrel, which in turn increased the WSI. Previous studies show the WSI is greater with a higher concentration of starch (de Mesa et al., 2009; Hashimoto & Grossman, 2003 *Intl. J. Food Sci Technol*. 38:511-517).

Water Holding Capacity

Figure 3B:
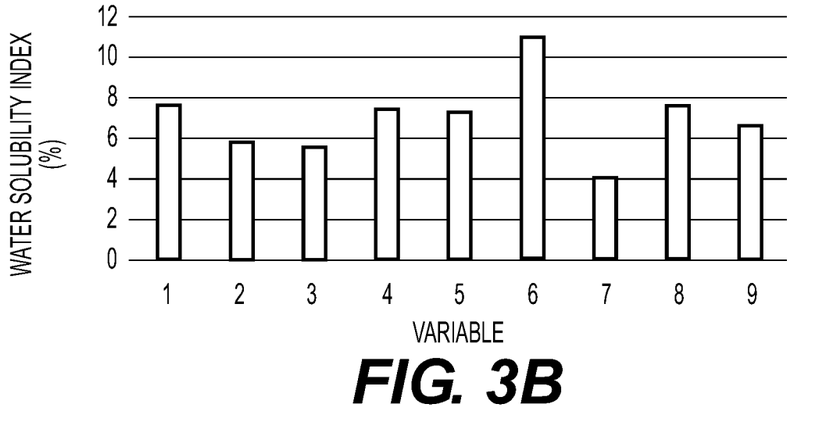
Figure 3C:
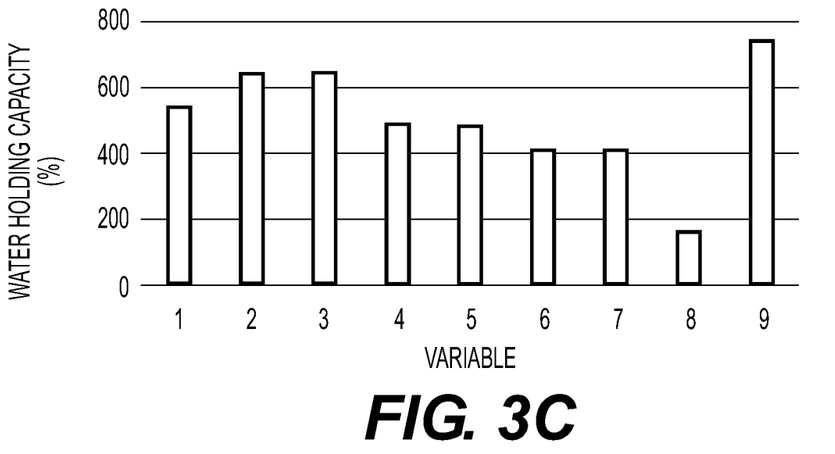

Raw meat products have moisture contents ranging from 55 to 75% wet basis. This property is optimum for consumer's sensory experience, and to describe "juiciness". For a plant-based meat alternative to be optimally accepted by consumers, the appropriate amount of water for hydration is imperative to imitate meat like texture and ensure consumer acceptability. Water Holding Capacity (WHC) measures the amount of water the intact product is able to hold upon rehydration (FIG. 3B). This gives insight into the ability of the product structure to retain water and is commonly affected by texturization (Samard & Ryu, 2019 2018 J. Sci. Food Agriculture 99(6)). WHC data show the amount of water held by the extrudates was inversely related to bulk density. WHC was the greatest for 0% and 50% CPF treatments (74.1 and 76.0%, respectively), and these products showed the lowest bulk density. The lower density products can hold more water due to their porous internal structures (Lin, Huff, & Hsieh, 2002 *J. Food Sci*. 67:1066-1072). High porosity and consequently high WHC may contribute to poor product quality as more retained moisture in the product will contribute to a soft texture. Products with the least porosity and highest bulk density (10, 20, and 30% CPF) had lower WHC (55.5 to 65.9%), which leads to better texture (Ma & Ryu, 2019 *Food Sci Biotechnol*. 28:67-74). This was confirmed by the textural analysis in Table 6).

Summary

Nine different formulas were extruded in a Buhler 62 mm twin screw extruder. PURIS pea protein isolate was found to be the optimum protein in most extrusion conditions used in this study. PURIS has a limited release protein that was also closely studied, and it was found to perform better in extrusion than the original PURIS 870 product. The new protein isolate is reported to have better gelling properties. It was confirmed that this new protein has better surface-active properties (foaming, gelling, and emulsification) than the earlier version of PURIS 870. The optimum textural properties from a sensorial perspective are those that measure in the overall average of the nine variables tested. Human perception confirmed this in an informal sensory analysis. It appears the two variables made with PURIS 870 HG is the optimal formulation.

Modifications and variations of the compositions and methods of making will be apparent to those skilled in the art from the foregoing detailed description and are intended to come within the scope of the appended claims.

We claim:

1. An extruded plant based meat substitute comprising protein derived from peas,
   alkali in an amount effective to increase pH to between 7.0 and 7.5 and to improve extrusion,
   hydrophilic polymer selected from the group consisting of processed maple fiber, psyllium fiber, pectin and alginate, in an amount between 3 and 10% weight to weight hydrophilic polymer to protein, and
   yeast extract flavoring in an amount between 5 and 12%, w/w dry matter,
   wherein the extruded plant based meat substitute comprises between about 70 and 95% protein.

2. The meat substitute of claim 1 wherein the alkali is selected from the group consisting of calcium hydroxide, sodium hydroxide, ammonium hydroxide, magnesium hydroxide, potassium hydroxide, sodium carbonate, sodium bicarbonate, potassium bicarbonate, potassium carbonate, magnesium carbonate, and mixtures thereof.

3. The meat substitute of claim 1 wherein the hydrophilic polymer is processed maple fiber.

4. The meat substitute of claim 3 wherein the hydrophilic polymer to protein is in a weight ratio of about 5% dry weight hydrophilic polymer to dry weight protein.

5. The meat substitute of claim 1 comprising pea protein in combination with processed maple fiber, a 21% solution of calcium hydroxide, 0.5% of high viscosity sodium or calcium alginate and 0.5% of low methoxyl pectin.

6. The meat substitute of claim 1 comprising one or more yeast extracts present in a ratio between one and 10% by weight.

7. The meat substitute of claim 6 wherein the yeast extract creates a flavor selected from the group consisting of beef, chicken, pork, fish or seafood.

8. The meat substitute of claim 1 in pieces having a length, height, or width of at least 1.27 cm.

9. The meat substitute of claim 7 wherein the meat substitute is dried, rehydrated, battered, breaded, ground or in a sauce.

10. The meat substitute of claim 8 in the form of chicken nuggets, fish sticks, ground beef, chicken strips, and sauced products.

11. A method of making an extruded meat substitute comprising
    pea protein,
    alkali in an amount effective to increase pH to between 7.0 and 7.5 and to improve extrusion,
    hydrophilic polymer selected from the group consisting of processed maple fiber, psyllium fiber, pectin and alginate, in an amount between 3 and 10% weight to weight hydrophilic polymer to protein, and
    yeast extract flavoring in an amount between 5 and 12%, w/w dry matter,
    comprising mixing the ingredient and then feeding the mixture into an extruder and through a die,
    wherein the extruded plant based meat substitute comprises between about 70 and 95% protein.

12. The method of claim 11 comprising adding alkali as 10%-21% calcium hydroxide solution.

13. The method of claim 11 wherein the extruder is a twin screw and extrusion is performed at between 130 and 165° C.

14. The method of claim 13 wherein the extruder includes a slotted die that can produce meat substitute pieces between 2.54 cm to 25.4 cm length, height or width, or from a 1.27 cm cube to 20.32 cm 17.78 cm by 2.54 cm pieces.

15. The method of claim 11 wherein a dry extrusion-process is used.

16. The method of claim 11 wherein the extruded meat substitute is dried.

17. The method of claim 11 wherein the meat substitute is ground.

18. The method of claim 11 wherein the meat substitute is packaged in a sauce.

19. The method of claim 11 wherein the meat substitute is formulated into seafood or fish substitute.

20. The method of claim 13 wherein the extrusion is performed at between 155-162° C.

\* \* \* \* \*

UNITED STATES PATENT AND TRADEMARK OFFICE
CERTIFICATE OF CORRECTION

| | |
|---|---|
| PATENT NO. | : 11,484,044 B1 |
| APPLICATION NO. | : 17/468369 |
| DATED | : November 1, 2022 |
| INVENTOR(S) | : Dominik Grabinski and William R. Aimutis |

It is certified that error appears in the above-identified patent and that said Letters Patent is hereby corrected as shown below:

In the Claims

Claim 14, Column 17, Line 7, replace "20.32 cm 17.78 cm by 2.54 pieces" with --20.32 cm by 17.78 cm by 2.54 pieces--.

Signed and Sealed this
Twenty-seventh Day of December, 2022

Katherine Kelly Vidal
*Director of the United States Patent and Trademark Office*